United States Patent Office 3,647,769
Patented Mar. 7, 1972

3,647,769
REACTION PRODUCTS OF POLYNITRILES,
WATER AND AMINES
Richard G. Bufton, Painesville, John R. Semancik, Mentor, and George G. King, Painesville, Ohio, assignors to Diamond Shamrock Corporation, Cleveland, Ohio
No Drawing. Filed Nov. 14, 1969, Ser. No. 877,008
Int. Cl. C08f 3/90, 3/76, 15/22
U.S. Cl. 260—85.5
10 Claims

ABSTRACT OF THE DISCLOSURE

Water soluble reaction products are produced by reaction of a polymer or copolymer of acrylonitrile with a primary amine, a secondary amine or a polyamine having a primary or secondary amine group in the presence of water. These reaction products are useful as flocculants in the separation of suspended solids from aqueous systems. The reaction product of polyacrylonitrile, water and N,N-dimethyl-1,3-propanediamine is a useful flocculant in treatment of process water in paper making.

BACKGROUND OF THE INVENTION

(1) Field of the invention

This invention relates to an improved process for producing flocculants, an improved flocculant produced by the process and its use. More particularly an improved polyelectrolyte polymer flocculant is produced by reaction of a polymer or copolymer of acrylonitrile with a primary amine, a secondary amine or a polyamine having a primary or secondary amine group in the presence of water and is used to separate suspended solids from an aqueous system.

(2) Description of the prior art

Polyelectrolyte polymers such as poly(N-substituted acrylamide) have been prepared by (a) reaction of a polyacrylic acid or polyacrylic ester with an amine and by (b) polymerization of monomeric N-substituted acrylamide.

Procedure (a) is time consuming and expensive because a polyacrylic acid or polyacrylic ester must be prepared, reacted initially with an amine at temperatures above 100° C. and then reacted at temperatures above 200° C. to obtain the desired poly(N-substituted acrylamide). Crosslinking occurs when the polyacrylic acid or polyacrylic ester is reacted with a polyamine at a temperature of about 200° C. Imide groups are formed between the polyacrylic chains and produce insoluble polyacrylic polymers which are not useful flocculants. Further, not all of the ester groups are converted to amide groups when a polyacrylic ester is reacted with an amine. Since the unconverted ester groups are not as active as the amide groups, they do not contribute as much to flocculating properties of the polymer as the amide groups do and may actually impair the flocculating efficiency of the polymer.

Procedure (b) requires preparation of a monomeric N-substituted acrylamide which must then be polymerized. Monomeric N-substituted acrylamides are difficult to prepare and purify particularly if the amide substituent is derived from a polyamine. The monomeric acrylamide must be of high quality and purity if a useful reproducible polymer having consistent properties is to be obtained. The chemical and physical properties of the polymer should not vary widely.

SUMMARY OF THE INVENTION

An improved process for producing water soluble flocculants has been developed. The process involves reaction of a polymer or a copolymer of acrylonitrile with a primary amine, a secondary amine or a polyamine having a primary or secondary amine group in the presence of water to obtain an improved water soluble polyelectrolyte polymer flocculant, which is the reaction produtc of a polymer or copolymer of acrylonitrile, an amine and water. The term water soluble flocculant as used herein includes water soluble, alcohol soluble and/or water dispersible flocculants. The improved flocculant is useful in the separation of suspended solids from aqueous systems such as dispersions, suspensions, slurries, and the like in widely diverse industries such as mineral dressing, paper making, chemical processing, sewage treatment such as raw sewage or digested sewage sludge treatment, drainage and dewatering aids, water clarification, food processing, dairy processing, and the like.

It is an object of the present invention to provide an improved process for producing a polyelectrolyte polymer flocculant. A further object is to provide an improved flocculant by reaction of a polymer or a copolymer of acrylonitrile with a primary amine, a secondary amine or a polyamine in the presence of water. Still another object is to provide an improved process for separation of suspended solids from aqueous systems using the improved flocculant. Other objects will become apparent from the detailed description given hereinafter. It is intended, however, that the detailed description and specific examples do not limit the invention but merely indicate preferred embodiments thereof since various changes and modifications within the scope of the invention will become apparent to those skilled in the art.

DESCRIPTION OF THE PREFERRED EMBODIMENTS

The improved process of the present invention involves the following reaction of a nitrile (—CN) group in an acrylonitrile unit of a acrylonitrile polymer or copolymer with a primary amine, a secondary amine or a polyamine in the presence of water:

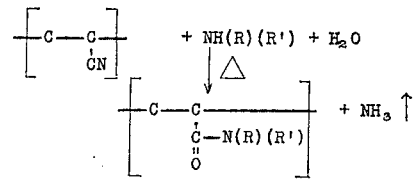

where R is an alkyl, alkoxy, alkylalkoxy, alkanol, aminoalkyl, amino-aza-alkyl group, or the like and R' is hydrogen, an alkyl, alkoxy, alkylalkoxy, alkanol, aminoalkyl, amino-aza-alkyl group, or the like. If desired, R and R' can be united to form a heterocyclic structure with the nitrogen atom to which they are attached.

At least 0.8 mole of a primary amine, a secondary amine or a polyamine having a primary or secondary amine group and at least 0.2 mole of water are reacted at a temperature of at least 80° C. for at least one-half hour with each nitrile group (—CN) group present in the acrylonitrile polymer or copolymer. Water soluble polyelectrolyte polymers can be prepared by reacting at a temperature of from about 80° C. to about 250° C. a mixture of an acrylonitrile homopolymer or copolymer, an amine and water wherein there is present in the mixture from about 0.8 to about 20 moles of the amine and from about 0.2 to about 15 moles of water per nitrile group present in the homopolymer or copolymer.

This process has the further advantage that one of the terminal primary amine groups present in a polyamine having at least two terminal primary amine groups can be reacted with the nitrile group without reacting other primary amine groups so that a reaction product of an acrylonitrile polymer or copolymer having at least one free or unreacted terminal primary amine group can be obtained. Thus, a water soluble polyelectrolyte polymer presumed to be a poly(N-substituted acrylamide) having a free or unreacted terminal primary amine group can be prepared by reaction of a polymer or copolymer of acrylonitrile with a polyamine such as ethylenediamine, diethylenetriamine, or the like in the presence of water.

It was completely unexpected that the reaction on which the process is based would be so selective that the reaction can be used to produce a water soluble reaction product of an acrylonitrile polymer or copolymer and a polyamine having a free or unreacted terminal primary amine group. The two terminal primary amine groups in a polyamine such as ethylenediamine or diethylenetriamine are considered to be equivalent and to be equal in reactivity. Such polyamines are polyfunctional. One would predict that both amine groups would react with equal ease and would be expected to form a crosslinked or a cyclic reaction product. The reaction products obtained by this process when polyamines having at least two terminal primary amine groups are used could not have been predicted on the basis of the prior art and are unexpected.

Any polymer or copolymer of acrylonitrile, which will produce a water soluble product on reaction with a primary amine, a secondary amine or a polyamine having a primary or secondary amine group in the presence of water in the above process, can be used in this invention. Homopolymers of acrylonitrile having a number average molecular weight of from about 500 to about 5,000,000 can be used. Polymers having a molecular weight of from about 12,000 to about 1,100,000 are particularly useful. Copolymers of acrylonitrile having molecular weights in the above ranges can also be used. Such copolymers should contain sufficient acrylonitrile to produce a water soluble or water dispersible product on reaction with an amine. For example, a copolymer can contain about 25% by weight of acrylonitrile and have a molecular weight in the above mentioned ranges. Useful copolymers include copolymers of acrylonitrile derived from comonomers such as olefins, halogenated olefins, acrylic esters, acrylic amides, acrylic acids, styrenes, vinyl esters, vinyl ethers, and the like. Specific comonomers include ethylene, propylene, isoprene, butadiene, vinyl chloride, styrene, methyl vinyl ether, vinyl acetate, methyl acrylate, methyl methacrylate, or the like. The term polymers and copolymers of acrylonitrile includes polymers and copolymers of methacrylonitrile.

The above acrylonitrile polymers and copolymers have been described in numerous patents and publications. They are well known in the art.

Any primary amine, a secondary amine or a polyamine which will react with the above polymers or copolymers of acrylonitrile to form a water soluble reaction product useful as a flocculant can be used. Suitable amines include those having from one to about ten carbon atoms. The amine can be (a) a simple primary or secondary amine, (b) a polyamine having a primary or secondary amine group or (c) a primary or secondary amine such as an alkanolamine or alkoxyamine having a primary or secondary amine group. The term polyamine as used herein includes diamines having one or more primary or secondary amine groups.

Simple primary or secondary amines of the formula

where $R^1$ is alkyl and $R^2$ is alkyl can be used. Useful amines include monomethylamine, dimethylamine, monoethylamine, diethylamine, mono-i-propylamine, n-propylamine, n-butylamine, ethyl methylamine, ethylpropylamine, methylpropylamine, and the like.

Polyamines having a primary or secondary amine group include diamines of the formula

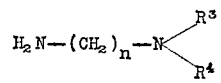

where $n$ is 2 or 3; $R^3$ is hydrogen, alkyl or alkanol; $R^4$ is hydrogen, alkyl, alkanol, aminoalkyl and $R^3$ and $R^4$ can be joined to form a cyclic structure such as —$CH_2CH_2OCH_2CH_2$—, —$CH_2CH_2NHCH_2CH$— or the like can be used. Other useful polyamines include ethylenediamine, diethylenetriamine, di(2-aminoethyl)ether, 3-aminopropylmorpholine, N-(3-aminopropyl) - diethanolamine, N-methylethylenediamine, N,N-dimethylethylenediamine, N,N-dimethyl-1,3-propanediamine, N-methyl-1, 3-propanediamine, N-(2-aminoethyl)-ethanolamine, N-(2-aminoethyl) - isopropanolamine, 1,3 - propanediamine, or the like.

Alkanolamines and alkoxyamines of the formula

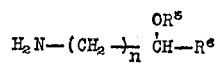

where $n$ is 1 or 2; $R^5$ is alkyl or hydrogen and $R^6$ is alkyl or hydrogen can be used. Useful alkanolamines and alkoxyamines include monethanolamine, monoisopropanolamine, methoxypropylamine, ethoxypropylamine, methoxyethylamine, ethoxyethylamine, methoxymethylamine, ethoxymethylamine, 3-amino-1-propanol(propanolamine), 2-amino-1-propanol, and the like. Other useful amines include diethanolamine, hydroxylamine, o-methylhydroxylamine, and the like.

Water soluble reaction products of acrylonitrile polymers or copolymers with primary amines, secondary amines or polyamines produced by the process of this invention have been found to be highly effective flocculants in processes where a flocculating amount of the reaction product is added to an aqueous system containing suspended solids. By flocculating amount is meant that quantity of the reaction product, which when added to a dispersion, suspension or slurry of suspended solids in an aqueous system, is sufficient to flocculate, precipitate or coagulate suspended solids. The quantity of the reaction product required to flocculate the suspended solids present in an aqueous system is determined in part by the nature of the solids, particle size of the solids, impurities or contaminants present in the suspended solids, presence and nature of inert solids in the aqueous system, the quantity of solids present in the aqueous system and other factors. From about 0.1 p.p.m. to about 50 p.p.m. of the reaction product is usually adequate to flocculate, precipitate or coagulate the suspended solids present in an aqueous system. The solids content of the aqueous system can vary from about 0.5 p.p.m. by weight to about 30% by weight of the total weight of the aqueous system. Such aqueous systems encompass turbid tap waters when these reaction products are used to remove turbidities which are caused by the presence of very small quantities of suspended solids.

To achieve optimum efficiency with a polyelectrolyte polymer flocculant of the present invention, the flocculant should be uniformly distributed throughout the aqueous system. Uniform distribution of the flocculant in the aqueous system can be accomplished by use of a solution of the flocculant which is as dilute as practical without causing over dilution of the system being treated. It is to be understood that the flocculant can be either dissolved or dispersed in the aqueous system. However, the flocculant can be added in solid form or as a concentrated solution provided uniform distribution of the flocculant in the aqueous system is obtained. The flocculant should be added to the aqueous system by a procedure which assures uniform distribution. For example, a dilute solution of the flocculant can be added to the system and the resulting mixture agitated to obtain uniform distribution of the flocculant, but not sufficiently high in shear energy to break up the colloidal aggregates. The flocculant can be added to the system while the system is being circulated during processing. After the flocculant has been uniformly mixed in the aqueous system and circulation stopped, agglomeration or aggregation of suspended solids present in the system occurs. The resulting agglomerates or aggregates then separate from the aqueous phase and can be removed by sedimentation, flotation, filtration, or the like.

The polyelectrolyte polymer flocculants of this invention can be used in aqueous systems at any temperature above the freezing point of the liquid to any temperature up to the boiling point of the liquid. If desired, the flocculant can be used at temperatures above the boiling point of the aqueous system provided that the process is carried out under sufficient pressure to maintain water present in the aqueous system in the liquid phase. The flocculants are usually used in aqueous systems at temperatures above 32° F. to about 110° F. The only limitation on temperature is the necessity of working in an aqueous fluid system.

These water soluble polyelectrolyte polymers can be used for flocculating, precipitating, and coagulating a large variety of suspended solid materials from aqueous systems such as dispersions, suspensions, slurries, and the like. They can be used as the only flocculant or may be used in conjunction with conventional flocculants such as alums, aluminum sulfate, calcium chloride, lime, iron salts, glues, gelatins, starches, cellulose derivatives, and the like. These water soluble polyelectrolyte polymers can be used to clarify water for domestic and industrial purposes; in flocculating, settling, thickening, and dewatering processes used in the flotation, concentration, and tailings of minerals; in processing of liquors from leaching of mineral or ore materials with water or with solutions of acids, alkalis, cyanides, and the like; in removal of chemical precipitates from water such as those which are finely dispersed in soluble calcium, magnesium aind uranium salts; in processing of various industrial aqueous systems including those from electroplating, paper making, paper processing, deinking, tanning, food and textile products, dairy processing; also in processing of mine wastes and effluents from plants treating sand, gravel, cement materials, iron ores, coal, zinc ores, uranium and phosphate rock, textile waste, domestic and industrial sewage, foundry waste as well as suspensions occurring in the procesing of various industrial clay, fillers, coating material, asbestos, metal oxides, pigments, and the like.

The water soluble flocculants of this invention improve sedimentation and filtration rates when the above aqueous systems are dewatered by sedimentation or filtration methods. In addition, handling of sedimentation and filtration by-products such as filter cakes and dewatered products is greatly improved in that the by-products are more concentrated and can be readily removed from the equipment. A useful application is the filtration of sewage sludge.

Solid materials which can be flocculated or coagulated with the polyelectrolyte polymers of this invention include phosphate rock, basic titanium dioxide, kaolin, montmorillonite, and illite or hydromica groups, halloysite, limonite, dolomite, pulverized shale, asbestos, calcium carbonate, sodium chloride, iron sulfate, aluminum sulfate, sodium carbonate, sodium bicarbonate, other oxides, salts, clays, and the like as well as by-products, residues, and the like from chemical processing, paper making, hydraulic mining, and the like. Other suitable solids include clays such as kaolinite, bentonites, that is, sodium, potassium lithium, calcium or other bentonites, attapulgite, hectorite, montronite, beidellite, saponite, nacrite, fuller's earth, anauxite, dickite, sericite, and the like. These solids are in the form of aqueous suspensions, dispersions, slurries, or the like.

The flocculants disclosed in the present invention have other advantages. They are useful over a wide pH range and give good results over the pH range utilized in mineral recovery operations. They also give good flocculation, settling and/or filtration rates with or without the addition of other electrolytes. Soluble electrolytes are often present in the mineral in commercial mineral recovery operations and additional electrolytes may have been added.

These water soluble polyelectrolyte flocculants can also be used in the flocculation of solids such as organic polymeric materials suspended in aqueous systems. The flocculants can be used to flocculate natural rubber, synthetic rubber, other natural resins and polymers as well as other synthetic resins and polymers. Natural rubber, synthetic rubber, and resins are often employed in latex or emulsion form in papermaking, textile operations, and the like and large quantities of water are contaminated with these materials. Contaminated water must be clarified and purified by flocculation, precipitation, and/or coagulation of suspended solids before it can be discharged as effluent or reused.

The flocculants of this invention are particularly useful in the removal of fillers and fines from process waters in papermaking. When papermaking stock goes onto the Fourdrinier wire at a consistency of 0.5 to 1.0%, the water from stock that passes through the meshes of the wire carries with it a certain percentage of fine fibers. This water is known as white water. The white water flows into the save-all pans, trays, or pit under the wire and then flows back to the mixing box where it is used to dilute new stock being supplied to the machine.

Fiber content of white water will vary greatly depending on the character of the stock. Where sulphite or other long fiber chemical pulps are used with little, if any, filler, the white water will contain a small percentage of small fibers; but where considerable groundwood or other short-fiber pulps are used, the white water will contain a higher percentage of fibers.

It is essential that the white water be reused wherever possible in the papermaking process such as on the paper machine (wires, felts, and the like), thinning of the stock from the deckers and to the screens, screen showers, washing and slushing the stock, in the blow pits. Reusage of white water reduces fiber waste, water consumption in the mill, and pollution problems arising from discharge of the water into potable water sources.

However, special conditions in the mill may prevent or materially reduce reuse of white water, unless the water is treated prior to reuse. For instance, in the manufacture of highly absorbent and purified filter papers, white water containing small fibers can not be reused because small fibers and other small colloidal particles will clog the capillaries and reduce the absorbency of the filter paper Likewise, a mill making different highly colored, loaded and sized paper can not reuse white water from one type or color of paper on a machine making another type or color or on the same machine after the furnish has been changed. Under certain conditions, the flocculants of this invention can be used to reduce or minimize soluble color in white water. Also, these flocculants can be affixed to a flocculate colloidal substrate to form an absorbent which is quite effective in the removal of some soluble color bodies from white water.

The water soluble flocculants of this invention have been evaluated in the treatment of white water in paper making and in the treatment of sewage. They have been found to be effective flocculants in both applications. Additional details of the results obtained in the tests with these flocculants in both applications are given in the examples below.

Reference may also be made to the examples for a fuller understanding of the nature and objects of this invention. The examples are given merely to illustrate the invention and are not to be construed in a limiting sense. All quantities, parts, and proportions are by weight and all temperatures are ° C. unless otherwise indicated.

EXAMPLE 1

Reaction of polyacrylonitrile with N,N-dimethyl-1,3-propanediamine

Polyacrylonitriles having different number average molecular weights were reacted with N,N-dimethyl-1,3-propanediamine in the presence of water to obtain the reaction products described in Examples 1–5.

A well stirred slurry of polyacrylonitrile (25 g., 0.47 m.) with a number average molecular weight of 12,000, water (7 g., 0.39 m.) and N,N-dimethyl-1,3-propanediamine (205 g., 2.0 m.) was heated at 117–125° C. for 16 hours to obtain a homogeneous solution. Removal of excess amine from the solution by vacuum distillation gave a water soluble polyelectrolyte polymer, the reaction product of a polyacrylonitrile and N,N-dimethyl-1,3-propanediamine.

EXAMPLE 2

Reaction of polyacrylonitrile with N,N-dimethyl-1,3-propanediamine

A well stirred slurry of polyacrylonitrile (26.5 g., 0.50 m.) with a number average molecular weight of 70,000, water (5.3 g., 0.29 m.) and N,N-dimethyl-1,3-propanediamine (123 g., 1.2 m.) was heated at 111–124° C. for 18 hours to obtain a homogeneous solution. Water (60 g., 3.3 m.) was added during the last 10 hours of heating. Removal of excess amine and water from the solution by vacuum distillation yielded a viscous oil which was subsequently dissolved in methanol to obtain a solution. Removal of the methanol from the solution gave 67.4 g. of a water soluble polyelectrolyte polymer, the reaction product of polyacrylonitrile and N,N-dimethyl-1,3-propanediamine.

EXAMPLE 3

Reaction of polyacrylonitrile with N,N-dimethyl-1,3-propanediamine (A) A ten-gallon reactor was charged with polyacrylonitrile (2.28 kg.) with a number average molecular weight of 140,000, water (0.65 kg.) and N,N-dimethyl-1,3-propanediamine (23.3 kg.). The mixture was heated at 109° C. for 16 hours with vigorous agitation to obtain a homogeneous solution. The violatiles were stripped from the solution at reduced pressure to obtain 6.00 kg. of a water soluble polyelectrolyte polymer, the reaction product of polyacrylonitrile and N,N-dimethyl-1,3-propanediamine.

(B) A mixture of polyacrylonitrile (15.0 g., 0.28 m.) with a number average molecular weight of 140,000, water (4.2 g., 0.23 m.) and N,N-dimethyl-1,3-propanediamine (120 g., 1.90 m.) was heated with agitation at a pot temperature of 115–120° C. and at an oil bath temperature of 134° C. for 16 hours. Excess unreacted amine was stripped off at atmospheric pressure and the residue, the reaction product of polyacrylonitrile and N,N-dimethyl-1,3-propanediamine heated to an oil bath temperature of 243° C. over 7.5 hours. At the end of this heating period, the reaction product was completely water soluble. A nitrogen analysis of the reaction product was within the expected limits calculated for the reaction product.

EXAMPLE 4

Reaction of polyacrylonitrile with N,N-dimethyl-1,3-propanediamine

A well stirred slurry of polyacrylonitrile (26.7 g., 0.51 m.) with a number average molecular weight of 610,000, water (6.7 g., 0.37 m.) and N,N-dimethyl-1,3-propanediamine (102 g., 1.0 m.) was heated at 100–105° C. for 16.75 hours to obtain a homogeneous solution. Removal of volatiles from the solution by reduced pressure distillation gave 84.6 g. of the reaction product of polyacrylonitrile and N,N-dimethyl-1,3-propanediamine, a water soluble polyelectrolyte polymer.

EXAMPLE 5

Reaction of polyacrylonitrile with N,N-dimethyl-1,3 propanediamine

A well stirred slurry of polyacrylonitrile (25 g., 0.47 m.) with a number average molecular weight of 640,000, water (7 g., 0.39 m.) and N,N-dimethyl-1,3-propanediamine (205 g., 2.0 m.) was heated at 116–125° C. for 16 hours to obtain a homogeneous solution. Removal of the excess amine and other volatiles from the solution by reduced pressure distillation gave the reaction product of polyacrylonitrile and N,N - dimethyl - 1,3 - propanediamine, a water soluble polyelectrolyte polymer.

EXAMPLE 6

Reaction of polyacrylonitrile with N,N-dimethyl-1,3-propanediamine using an inert solvent A well stirred slurry of polyacrylonitrile (26.5 g., 0.50 m.) with a number average molecular weight of 140,000, water (9.8 g., 0.54 m.), N,N-dimethyl-1,3-propanediamine (78.1 g., 0.77 m.) and xylene (130 ml.) was heated at 100–110° C. for 22 hours to obtain a homogeneous solution. Removal of excess unreacted amine and xylene from this solution gave a water soluble polymer, the reaction product of polyacrylonitrile and N,N-dimethyl-1,3-propanediamine.

EXAMPLE 7

Reaction of polyacrylonitrile with N,N-dimethyl-1,3-propanediamine in absence of water This preparation shows that reaction of polyacrylonitrile with N,N-dimethyl-1,3-propanediamine in absence of water results in a water insoluble reaction mixture.

A well stirred slurry of vacuum dried polyacrylonitrile (25 g., 0.47 m.) with a number average molecular weight of 70,000 and N,N-dimethyl-1,3-propanediamine (123 g., 1.2 m.) were heated with agitation in the absence of water at reflux (135° C.) for 20 hours. At the end of this reaction period, the reaction mixture was still water insoluble. The quantity of solids which separated from the reaction mixture when the agitator was stopped was approximately equal to the quantity of polyacrylonitrile charged initially and indicated that reaction did not occur.

EXAMPLE 8

Reaction of polyacrylonitrile with monoethanolamine

The polyacrylonitrile used in Examples 8–19 had a number average molecular weight of 140,000. A slurry of monoethanolamine (306 g., 5.0 m.), polyacrylonitrile (25.0 g., 0.47 m.) and water (7.3 g., 0.40 m.) was heated at 110–123° C. for 1.25 hours (ca. 0.50 hour was required for solution to occur). The resulting homogeneous solution was distilled at reduced pressure until all of the volatiles were removed to obtain a yellow, oily residue. This residue was the reaction product of polyacrylonitrile and monoethanolamine, a water soluble polyelectrolyte polymer. The residue was dissolved in sufficient water to form a 10% by weight solution.

EXAMPLE 9

Reaction of polyacrylonitrile with N-(3-aminopropyl) diethanolamine

A well stirred slurry of polyacrylonitrile (25 g., 0.47 m.), water (0.9 g., 0.05 m.) and N-(3-aminopropyl)diethanolamine (449.3 g., 2.8 m.) was heated at 121–130° C. for 17 hours to obtain a homogeneous solution. The homogeneous mixture thus obtained was dissolved in methanol. Addition of ether with stirring caused the water soluble polyelectrolyte polymer, the reaction product of polyacrylonitrile and N-(3-aminopropyl)diethanolamine product to separate from the methanol solution.

EXAMPLE 10

Reaction of polyacrylonitrile with N-(2-aminoethyl) ethanolamine

A slurry of polyacrylonitrile (26.5 g., 0.50 m.), water (6.1 g., 0.34 m.) and N-(2-aminoethyl)ethanolamine (244.4 g., 2.3 m.) was heated at 130° C. for 16 hours to obtain a homogeneous solution. Excess amine and other volatiles were stripped from the resulting solution to obtain a yellow semi-solid reaction product which was then dissolved in methanol. Dilution of the methanol solution with ether caused the polymer to separate from the solution. The polymer, which was the desired reaction product of polyacrylonitrile and N-(2-aminoethyl)ethanolamine, was a water soluble polyelectrolyte.

EXAMPLE 11

Reaction of polyacrylonitrile with N-(3-N-aminopropyl)-morpholine

A slurry of dry polyacrylonitrile (26.5 g., 0.50 m.), water (3.1 g., 0.17 m.) and N-(3-aminopropyl)morpholine (216 g., 1.5 m.) was heated with stirring at 123–133° C. for 18 hours to obtain a homogeneous solution. Volatiles were stripped from the solution at reduced pressure to obtain a viscous residue which was then dissolved in methanol. Addition of ether to the methanol solution caused the reaction product of polyacrylonitrile and N-(3-aminopropyl)-morpholine, the desired polyelectrolyte polymer to separate from the solution. The product was collected by decantation and then vacuum dried. A yield of 78 g. was obtained. The polymer was water soluble.

EXAMPLE 12

Reaction of polyacrylonitrile with monoisopropanolamine

A well stirred slurry of polyacrylonitrile (25 g., 0.47 m.), water (5.6 g., 0.31 m.) and monoisopropanolamine (434 g., 5.8 m.) was heated at 120° C. for 17 hours to obtain a clear solution. Excess amine and other volatiles were removed from the solution by reduced pressure distillation to recover the reaction product in the form of a residue. The resulting residue was dissolved in methanol to obtain a methanol solution. Removal of the methanol on a rotary evaporator gave 75.8 g. of a water soluble polyelectrolyte polymer, the desired reaction product of polyacrylonitrile and monoisopropanolamine.

EXAMPLE 13

Reaction of polyacrylonitrile with 1-(2-aminoethylamino)-2-propanol

A well stirred slurry of polyacrylonitrile (15.0 g., 0.28 m.), water (6.9 g., 0.38 m.) and 1-(2-aminoethylamino)-2-propanol (405 g., 3.4 m.) was heated at 128° C. for 16 hours to form a homogeneous solution. Excess amine and other volatiles were stripped from the solution at reduced pressure to obtain a viscous brown oil which was then dissolved in methanol. Volatiles were then stripped from the methanol solution on a rotary evaporator to give 59 g. of viscous brown oil which was completely water soluble. The oil was the reaction product of polyacrylonitrile and 1-(2-aminoethylamino)-2-propanol, the desired polyelectrolyte polymer.

EXAMPLE 14

Reaction of polyacrylonitrile with 3-methoxypropylamine

A well stirred slurry of polyacrylonitrile (15 g., 0.28 m.), water (3.1 g., 0.17 m.) and 3-methoxypropylamine (354 g., 3.98 m.) was heated at 100–112° C. for 17 hours to obtain a homogeneous solution. Volatiles were stripped from the solution by reduced pressure distillation to recover the reaction product in the form of a residue. The residue was then dissolved in methanol and the resulting methanol solution was concentrated on a rotary evaporator at reduced pressure to obtain 48.7 g. of a viscous brown oil which was a water soluble polyelectrolyte polymer, the desired reaction product of polyacrylonitrile and 3-methoxypropylamine.

EXAMPLE 15

Reaction of polyacrylonitrile with diethanolamine

A well stirred slurry of polyacrylonitrile (15 g., 0.28 m.), water (4.3 g., 0.24 m.) and diethanolamine (368 g. 3.5 m.) was heated at 151–170° C. for 24 hours to obtain a homogeneous solution. The resulting clear solution was stripped at reduced pressure to remove excess amine and then concentrated to recover the product in the form of a brown solid. The product was a completely water soluble polyelectrolyte polymer, the desired reaction product of polyacrylonitrile and diethanolamine.

EXAMPLE 16

Reaction of polyacrylonitrile with dimethylamine

A slurry of dimethylamine (360 g., 8.0 m.), polyacrylonitrile (50 g., 0.94 m.) and water (180 g., 10 m.) was heated at 180° C. for 19 hours with strong agitation in a stainless steel autoclave at autogenous pressure. The resulting homogeneous solution was evaporated to dryness using water pump vacuum to obtain a pale yellow solid which was a water soluble polyelectrolyte polymer, the reaction product of polyacrylonitrile and dimethylamine.

EXAMPLE 17

Reaction of polyacrylonitrile with monomethylamine

A slurry of polyacrylonitrile (50 g., 0.94 m.), water (180 g., 10 m.) and monomethylamine (360 g., 11.6 m.) was heated with strong agitation to 180° C. for 20 hours in a stainless steel autoclave under autogenous pressure (900 p.s.i.g.). The resulting homogeneous solution was evaporated to dryness with water pump vacuum to yield the reaction product in the form of a pale yellow solid which was readily water soluble. The reaction product of polyacrylonitrile and monomethylamine was a water soluble polyelectrolyte polymer.

EXAMPLE 18

Reaction of polyacrylonitrile with diethylenetriamine

A slurry of dry polyacrylonitrile (15.0 g., 0.28 m.), water (4.7 g., 0.26 m.), diethylene triamine (188.4 g., 1.8 m.) was heated with good agitation at 114–118° C. for 16 hours to obtain a homogeneous solution which was distilled at reduced pressure to remove volatiles. The residue was then dissolved in methanol and the resulting methanol solution stripped on a rotary evaporator to give 63.2 g. of a dark viscous semi-solid which was a completely water soluble polyelectrolyte polymer, the reaction product of polyacrylonitrile and diethylene triamine.

EXAMPLE 19

Reaction of polyacrylonitrile with ethylenediamine

A well stirred slurry of ethylenediamine (225.0 g., 3.7 m.), polyacrylonitrile (15.0 g., 0.28 m.) and water (4.3 g., 0.24 m.) was heated at 110–116° C. for 17 hours to obtain a homogeneous solution. The resulting solution was distilled at reduced pressure to remove excess amine and then concentrated to recover the product in the form of a dark brown solid residue which weighed 36.0 g. The product was a completely mater soluble polyelectrolyte polymer, the resired reaction product of polyacrylonitrile and ethylenediamine.

EXAMPLE 20

Reaction of a copolymer of 36% by weight of acrylonitrile-vinyl chloride with N-N-dimethyl-1,3-propanediamine A well stirred slurry of a copolymer of acrylonitrile and vinyl chloride (60 g., 1.16 m.), water (7 g., 0.39 m.) N,N-dimethyl-1,3-propanediamine (499 g., 3.84 m.) was heated at 116–125° C. for 16 hours to obtain a homogeneous solution. Removal of excess amine and other volatiles from the solution by reduced pressure distillation gave the reaction product of the copolymer of acrylonitrile-vinyl chloride and N,N-dimethyl-1,3-propanediamine, a completely water soluble polyelectrolyte polymer.

EXAMPLE 21

Reaction of polyacrylonitrile with N,N-dimethyl-1,3-propanediamine

A well stirred slurry of polyacrylonitrile (25 g., 0.47 m.) with a number average molecular weight of 1,200,000, water (7 g., 0.39 m.) and N,N-dimethyl-1,3-propanediamine (204 g., 2.0 m.) was heated at 120° C. for 17 hours to obtain a homogeneous solution. Removal of the volatiles from the solution by reduced pressure distillation gave the reaction product of polyacrylonitrile and N,N-dimethyl-1,3-propanediamine, a water soluble polyelectrolyte polymer.

EXAMPLE 22

Reaction of polyacrylonitrile with N,N-dimethyl-1,3-propanediamine

The procedure of Example 21 was repeated using a polyacrylonitrile polymer with a number average molecular weight of 1,050,000 to obtain a water soluble reaction product of polyacrylonitrile and N,N-dimethyl-1,3-propanediamine.

EXAMPLE 23

Reaction of an acrylonitrile-styrene copolymer with N,N-dimethyl-1,3-propanediamine Fifteen g. of an acrylonitrile-styrene copolymer containing 4% by weight nitrogen was reacted with 122.5 g. (1.2 m.) of N,N-dimethyl-1,3-propanediamine and 4.2 g. (0.23 m.) water at 119° C. for 27 hours to obtain a solution. Removal of the volatiles from the solution by reduced pressure distillation afforded the reaction product of the copolymer and N,N-dimethyl-1,3-propanediamine, a water soluble polyelectrolyte polymer.

EXAMPLE 24

Reaction of polymethacrylonitrile with N,N-dimethyl-1,3-propanediamine

A well stirred slurry consisting of a polymer (16.0 g., 0.239 m.) polymethacrylonitrile (102 g., 1 m.) N,N-dimethyl-1,3-propanediamine and 3.5 g. (0.195 m.) of water was heated at 119° C. for 27 hours to obtain a solution. The number average molecular weight of the polymer was estimated to be between 150,000 and 180,000. Removal of the volatiles from the solution by reduced pressure distillation afforded the reaction product of polymethacrylonitrile and N,N - dimethyl - 1,3-propanediamine, a water soluble polyelectrolyte.

EXAMPLE 25

Reaction of an acrylonitrile-styrene copolymer and ethylenediamine

Twenty-five g. of an acrylonitrile-styrene copolymer containing 4% nitrogen was reacted with 112.5 g. (1.85 m.) ethylenediamine and 2.15 g. (0.12 m.) water at 114° C. for 27 hours to obtain a solution. Removal of the volatiles from the solution by reduced pressure distillation afforded the reaction product of the copolymer and ethylenediamine, a water soluble polyelectrolyte.

EXAMPLE 26

The reaction products obtained in Examples 1–20 above were evaluated as water soluble flocculants in the treatment of white water in paper making and in the treatment of sewage. These reaction products were tested using the Synthetic White Water Flocculation Test Procedure and Raw Sewage Test Procedure given below. Table I, entitled "Flocculation Tests With Reaction Products," shows results obtained with the reaction products in these tests. These reaction products were found to be effective flocculants both in the treatment of white water and in the treatment of sewage.

Synthetic white water flocculation test procedure

A synthetic white water suspension was prepared by blending 6 g. of paper pulp and 4 g. titanium dioxide with 500 ml. of water. The resulting suspension was diluted to 10 liters. The pH of this suspension was adjusted to 6.5 by addition of dilute hydrochloric acid.

The synthetic white water (600 ml.) was placed in a 1 liter beaker and agitated at 100 r.p.m. on the Phipps-Bird multiple stirrer (Matheson Scientific Co., Inc., Cleveland, Ohio). This unit has six stainless steel paddles, and the entire battery or any single paddle can be used at one time. Agitation speeds range from 10 r.p.m. to 100 r.p.m. and are measured by a direct reading tachometer.

The flocculant in concentrations of 0.5; 1.0 or 2.0 p.p.m. was added to individual synthetic white water sample. The resulting suspension was stirred at 100 r.p.m. for 2 minutes, and then at 30 r.p.m. for 10 minutes. Agitation was stopped and the suspension was allowed to settle for 15 minutes. The turbidity of the supernatant liquid was measured with a Hach Model 2100 Turbidimeter (Hach Chemical Co., Ames, Iowa). The turbidity is expressed as Jackson Turbidity Units (JTU). A blank sample of the white water has a JTU value of 1000.

Raw sewage flocculation test procedure

A 1200 ml. sample of raw sewage from the Mentor-Willoughby (Ohio) Sewage Treatment Plant in a 1500 ml. beaker was agitated at 100 r.p.m. The flocculant in concentrations of 0.5; 1.0 or 2.0 p.p.m. was added, and stirring at 100 r.p.m. was continued for 3 minutes. The mixture was then stirred at 30 r.p.m. for 20 minutes and allowed to settle for 20 minutes. A sample of the supernatant liquid was withdrawn and analyzed for Total Suspended Solids (TSS) according to the procedure given in Standard Methods for the Examination of Water and Wastewater, twelfth edition, American Public Health Association, Inc. The total suspended solids in the raw sewage was determined using the same procedure. The percent total suspended solids removal (percent TSSR) was calculated as follows:

$$\text{Percent TSSR} = \frac{\text{TSS raw} - \text{TSS treated}}{\text{TSS raw}} \times 100\%$$

TABLE I.—FLOCCULATION TESTS WITH REACTION PRODUCTS OF POLYNITRILES AND AMINES

| Reaction product of Example | White water flocculation reported as Jackson Turbidity Units using the indicated quantity of reaction product [1] | | | Raw sewage flocculation reported as percent total solids removed using the indicated quantity of reaction product | |
|---|---|---|---|---|---|
| | 0.5 p.p.m. | 1.0 p.p.m. | 2.0 p.p.m. | 0.5 p.p.m. | 1.0 p.p.m. |
| 1 | 34 | 32 | 31 | 58 | 64 |
| 2 | 36 | 36 | 43 | 56 | 51 |
| 3(A) | 21 | 26 | 58 | 63 | 67 |
| 4 | 30 | 22 | 33 | 54 | 50 |
| 5 | 32 | 36 | 42 | 64 | 64 |
| 6 | 37 | 33 | 24 | | |
| 8 | 110 | 110 | 100 | 42 | 46 |
| 9 | 120 | 85 | 39 | 55 | 50 |
| 10 | 31 | 18 | 17 | 58 | 58 |
| 11 | 35 | 22 | 31 | 61 | 58 |
| 12 | 99 | 94 | 72 | 55 | 60 |
| 13 | 29 | 33 | 41 | 58 | 62 |
| 14 | 91 | 71 | 46 | 64 | 61 |
| 15 | 133 | 148 | 168 | 62 | 65 |
| 16 | | | | 64 | 62 |
| 17 | 95 | 130 | 145 | 56 | 56 |
| 18 | 22 | 17 | 19 | 44 | 42 |
| 19 | 43 | 27 | 26 | 66 | 63 |
| 20 | 100 | 76 | 92 | 63 | 65 |

[1] Blank >1,000 Jackson Turbidity Units.

EXAMPLE 27

Reaction products obtained in Examples 21–25 above were evaluated as water soluble flocculants in the treatment of white water in paper making using the Synthetic White Water Flocculation Test Procedure given in Example 26 above. Table II, entitled "Flocculation Tests With Reaction Products of Polynitriles and Amines," shows the results obtained with the reaction products in these tests. The reaction products of Examples 21–25 were found to be effective flocculants in the treatment of white water.

TABLE II.—FLOCCULATION TESTS WITH REACTION PRODUCTS OF POLYNITRILES AND AMINES

| Reaction product of example | White water flocculation reported as Jackson Turbidity Units using the indicated quantity of reaction product [1] | | |
|---|---|---|---|
| | 0.5 p.p.m. | 1.0 p.p.m. | 2.0 p.p.m. |
| 21 | 50 | 52 | 57 |
| 22 | 57 | 53 | 72 |
| 23 | 275 | 270 | 275 |
| 24 | 195 | 120 | 94 |
| 25 | 160 | 170 | 195 |

[1] Blank >1,000 Jackson Turbidity Units.

EXAMPLE 28

The reaction product of polyacrylonitrile and N,N-dimethyl-1,3-propanediamine of Example 3(A) above was evaluated as a filtration aid in dewatering or filtering sewage sludge using the Vacuum Filtration of Sludge Test Procedure as given below.

Vacuum filtration of sewage sludge test procedure

This test is a screening test to determine the effectiveness of a filtration aid in dewatering or filtering sewage sludge. The equipment is a 9 cm. Buchner funnel using a No. 40 Whatman filter paper fitted over a 250 ml. measuring burette with a vacuum connection at the top of the burette. The vacuum source is an aspirator, capable of being controlled to 20 inches of mercury vacuum.

Measure 100 ml. of digestor sludge into a 250 ml. beaker. To a second 250 ml. beaker add the specified amount of the reaction product being tested as a dewatering agent in the form of a 1% by weight aqueous solution, then mix contents of both beakers by pouring the mixture of sludge and aqueous solution back and forth for 4 to 6 times. Pour the mixture into the Buchner funnel and apply vacuum immediately. Record time in seconds required to draw various volumes of filtrate into the burette and the volume of filtrate after 3 minutes.

Results obtained in this test with the reaction product and a blank where the reaction product was not used are shown in Table III. These data show that the reaction product of Example 3(A) is an effective filtration aid in dewatering or filtering sewage sludges.

TABLE III.—SEWAGE SLUDGE DEWATERING TESTS

| Reaction product of | Amount of reaction product added (p.p.m.) | Time (sec.) required to obtain indicated vol. of filtrate | | | | Vol. of filtrate (ml.) obtained after 3 min. |
|---|---|---|---|---|---|---|
| | | 10 ml. | 20 ml. | 30 ml. | 40 ml. | |
| Example 3(A) | 500 | 24 | 88 | | | 29 |
| | 1,000 | 12 | 46 | 105 | | 40 |
| | 2,000 | 11 | 37 | 81 | 143 | 45 |
| Blank | 0 | 88 | | | | 14.5 |

It is to be understood that although the invention has been described with specific reference to particular embodiments thereof, it is not to be so limited, since changes and alterations therein may be made which are within the full intended scope of this invention as defined by the appended claims.

What is claimed is:

1. A process for producing a water soluble polyelectrolyte polymer which comprises reacting at a temperature of from about 80° C. to about 250° C. a mixture of:
    (A) an acrylonitrile polymer selected from the group consisting of homopolymers and copolymers of acrylonitrile wherein said copolymer contains up to 85% by weight of a comonomer selected from the group consisting of vinyl chloride and styrene;
    (B) a saturated amine having about one to about ten carbon atoms selected from the group consisting of a primary monoamine, a secondary monoamine and a polyamine having a single primary or secondary amino group; and
    (C) water wherein there is present in said mixture from about 0.8 to about 20 moles of said amine and from about 0.2 to about 15 moles of water per nitrile group in said acrylonitrile polymer.

2. The process of claim 1 wherein said amine is selected from the group consisting of monomethylamine, dimethylamine, monoethanolamine, diethanolamine, monoisopropanolamine, N,N-dimethyl-1,3-propanediamine, 3-methoxypropylamine, N-(3-aminopropyl)morpholine and N-(3-aminopropyl)diethanolamine.

3. The process of claim 1 wherein said amine is N,N-dimethyl-1,3-propanediamine.

4. A process of separating suspended solids from an aqueous system which comprises the steps of treating said system with a flocculating amount of a water soluble polyelectrolyte polymer which consist essentially of a reaction product of:
    (A) an acrylonitrile polymer selected from the group consisting of homopolymers and copolymers of acrylonitrile wherein said copolymer contains up to 85% by weight of a comonomer selected from the group consisting of vinyl chloride and styrene;
    (B) a saturated amine having about one to about ten carbon atoms selected from the group consisting of a primary monoamine, a secondary monoamine, and a polyamine having a single primary or secondary amino group; and
    (C) water said reaction product having been prepared by reacting at about 80° C. to about 250° C., a mixture of from about 0.8 to about 20 moles of said amine and from about 0.2 to about 15 moles of said water per nitrile group in said acrylonitrile polymer.

5. The process of claim 4 wherein the amine is selected from the group consisting of monomethylamine, dimethylamine, monoethanolamine, diethanolamine, monoisopropanolamine, N,N-dimethyl-1,3-propanediamine, 3-methoxypropylamine, N-(3-aminopropyl)morpholine and N-(3-aminopropyl)diethanolamine.

6. The process of claim 4 wherein said amine is N,N-dimethyl-1,3-propanediamine.

7. The process of claim 4 wherein said aqueous system is process water used in paper making.

8. The process of claim 4 wherein the aqueous system is sewage.

9. The process of claim 7 wherein said amine is N,N-dimethyl-1,3-propanediamine.

10. The process of claim 8 wherein said amine is N,N-dimethyl-1,3-propanediamine.

References Cited

UNITED STATES PATENTS

| 2,595,575 | 5/1952 | Ham | 260—85.5 |
| 2,650,151 | 8/1953 | Ham | 260—85.5 S |
| 2,719,144 | 9/1955 | Shearer et al. | 260—88.7 |
| 2,758,003 | 8/1956 | Kleiner et al. | 260—85.5 S |
| 2,798,868 | 7/1957 | Miller | 260—85.5 |
| 2,817,649 | 12/1957 | Contois | 260—85.5 S |

(Other references on following page)

UNITED STATES PATENTS

| | | | |
|---|---|---|---|
| 3,288,707 | 11/1966 | Hurwitz et al. | 260—88.7 B |
| 3,300,406 | 1/1967 | Pollio | 260—88.7 B |
| 3,328,367 | 6/1967 | Rees | 260—85.5 |
| 3,406,139 | 10/1968 | Hurwitz et al. | 260—85.5 S |
| 2,593,888 | 4/1952 | Jones | 260—89.7 R |
| 3,242,152 | 3/1966 | Goren | 260—89.7 R |
| 3,480,761 | 11/1969 | Kolodny et al. | 260—89.7 R |

HARRY WONG, JR., Primary Examiner

U.S. Cl. X.R.

162—168; 210—54; 260—29.6, 33.4, 80, 88.7, 89.5, 89.7